(12) United States Patent
Marks

(10) Patent No.: US 8,857,098 B2
(45) Date of Patent: Oct. 14, 2014

(54) MARK I LOBSTER NET

(76) Inventor: James Dennis Marks, Cudjoe Key, FL (US)

( * ) Notice: Subject to any disclaimer, the term of this patent is extended or adjusted under 35 U.S.C. 154(b) by 416 days.

(21) Appl. No.: 13/199,004

(22) Filed: Oct. 17, 2011

(65) Prior Publication Data

US 2013/0091755 A1 Apr. 18, 2013

(51) Int. Cl.
*A01K 77/00* (2006.01)

(52) U.S. Cl.
USPC .............................................. 43/12

(58) Field of Classification Search
USPC .................................. 43/12, 11, 17
See application file for complete search history.

(56) References Cited

U.S. PATENT DOCUMENTS

| | | | | | |
|---|---|---|---|---|---|
| 4,492,052 | A | * | 1/1985 | Davis | 43/12 |
| 5,501,026 | A | * | 3/1996 | Bryant et al. | 43/12 |
| 5,581,929 | A | * | 12/1996 | Molloy | 43/12 |
| 5,822,908 | A | * | 10/1998 | Blanchard | 43/11 |
| 7,730,657 | B1 | * | 6/2010 | Gierucki | 43/12 |
| 8,261,482 | B1 | * | 9/2012 | Buchanan | 43/12 |
| 8,356,443 | B1 | * | 1/2013 | Hume | 43/11 |
| 8,490,318 | B2 | * | 7/2013 | Smith et al. | 43/12 |
| 2012/0036758 | A1 | * | 2/2012 | Steffens | 43/12 |

* cited by examiner

*Primary Examiner* — Christopher P Ellis

(57) ABSTRACT

Sport fishing for lobsters by divers is done with a hand held net. Lobsters in a net try to escape through the large net opening by flipping their tails. It is accordingly an object of the invention to trap a lobster and prevent it from escaping. The Mark I lobster net closes by flipping a lever with the thumb, preventing the lobster from escape. The overall density of the net is greater than that of sea water. If the net is dropped, it will fall to the bottom and not drift off. The handle is painted a florescent yellow so that it can be seen on the ocean floor.

4 Claims, 7 Drawing Sheets

WEIGHT - 8 OZ.
FRAME - ½" ALUM. TUBING
HANDLE - ¾" PVC

MARK I LOBSTER NET

BACKGROUND OF THE INVENTION

The Caridoid Escape Reaction, also known as lobstering or tailflipping, refers to an innate escape mechanism in marine crustaceans such as lobster and shrimp. The reaction allows crustaceans to escape predators through rapid abdominal flexions that produce powerful swimming strokes. This thrusts the crustacean through the water and away from danger.

The invention incorporates a means to trap a crustacean and prevent it from escaping. The one major problem associated with the majority of currently available nets is the lack of a means to close the net, thus allowing the crustacean to escape by tailflipping.

SUMMARY OF THE INVENTION

It is accordingly an object of the invention to trap a crustacean and prevent it from escaping. With regular nets, lobsters can flip their tails and escape. The Mark I lobster net has two versions, Mark I RH (right handed) and Mark I LH (left handed). There are only 2 differences between the two, everything else is exactly the same. The one difference is the hand that it is held in, therefore allowing the net to close with either the right thumb or the left thumb. The second difference is the motion of the closing of the net. The right hand net can only close from right to left and the left hand net can only close from left to right. These and other objects, features, and advantages of the invention will become more apparent when the detailed description is studied in conjunction with the drawings.

BRIEF DESCRIPTION OF THE DRAWINGS

The invention together with the other objects, features, aspects, and advantages thereof will be more clearly understood from the following in conjunction with the accompanying drawings.

DETAILED DESCRIPTION OF THE PREFERRED EMBODIMENT

Figure 1:
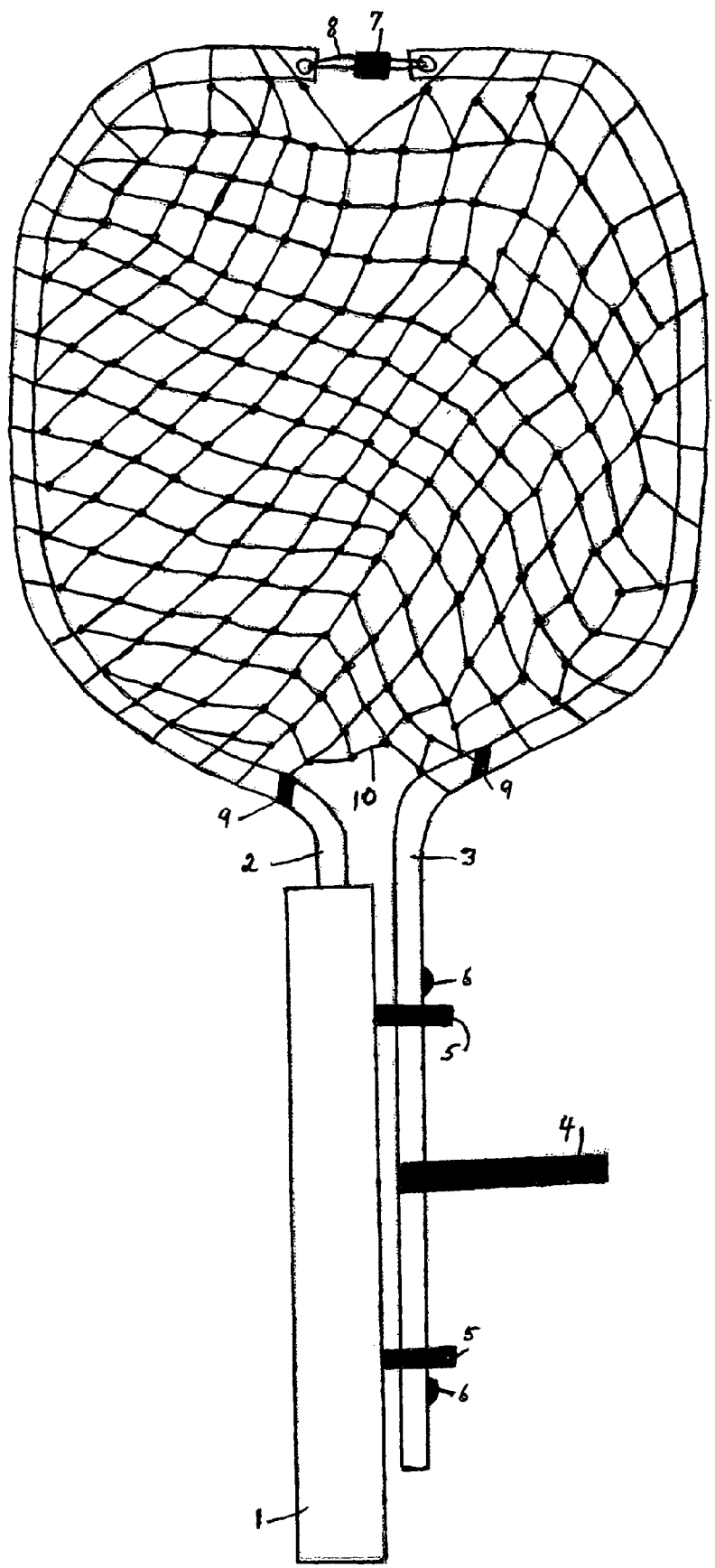
FIG. 1 is a perspective view of the right handed net structure in accordance with present invention, the net being shown in the open condition.

In the drawings, like parts are given the same reference numeral.

FIG. 1 is a top view of the right handed invention in the open position. A three quarter inch PVC pipe 1, eleven inches in length is used as the handle. Handle 1 is painted florescent yellow so that it can be spotted on the ocean floor if dropped. The invention has an overall density greater than ocean water so that it will not float away in a current if released. Aluminum frame 2 is securely fastened inside handle 1 with eye bolts 5. The eye bolts 5 are screwed into handle 1 and into frame 2. Aluminum frame 3 is inserted into eye bolts 5 and has 180 degrees of movement from right to left. The movement of frame 3 is accomplished with lever 4 using the right thumb. Lever 4 is a two and a half inch bolt screwed into frame 3. Sheet metal screws 6 keep frame 3 frame coming out of eyebolts 5. Frames 2 and 3 are connected at the top by cable 8 and crimped together with crimp 7. Hose clamps 9 keep net 10 from bunching up.

Figure 2:
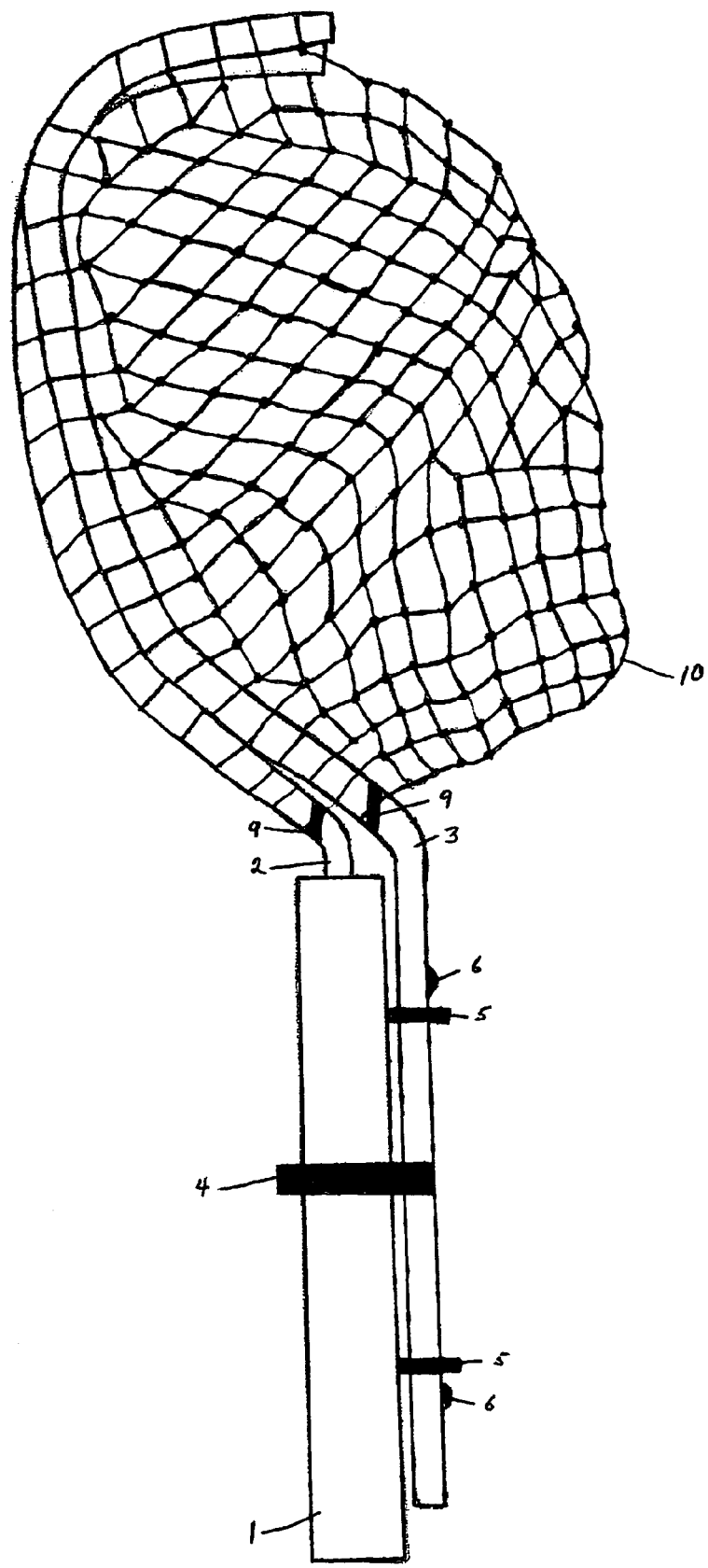
FIG. 2 is a further view of the right handed net in the closed condition.

FIG. 2 is a top view of the right handed invention in the closed position.

Figure 3:
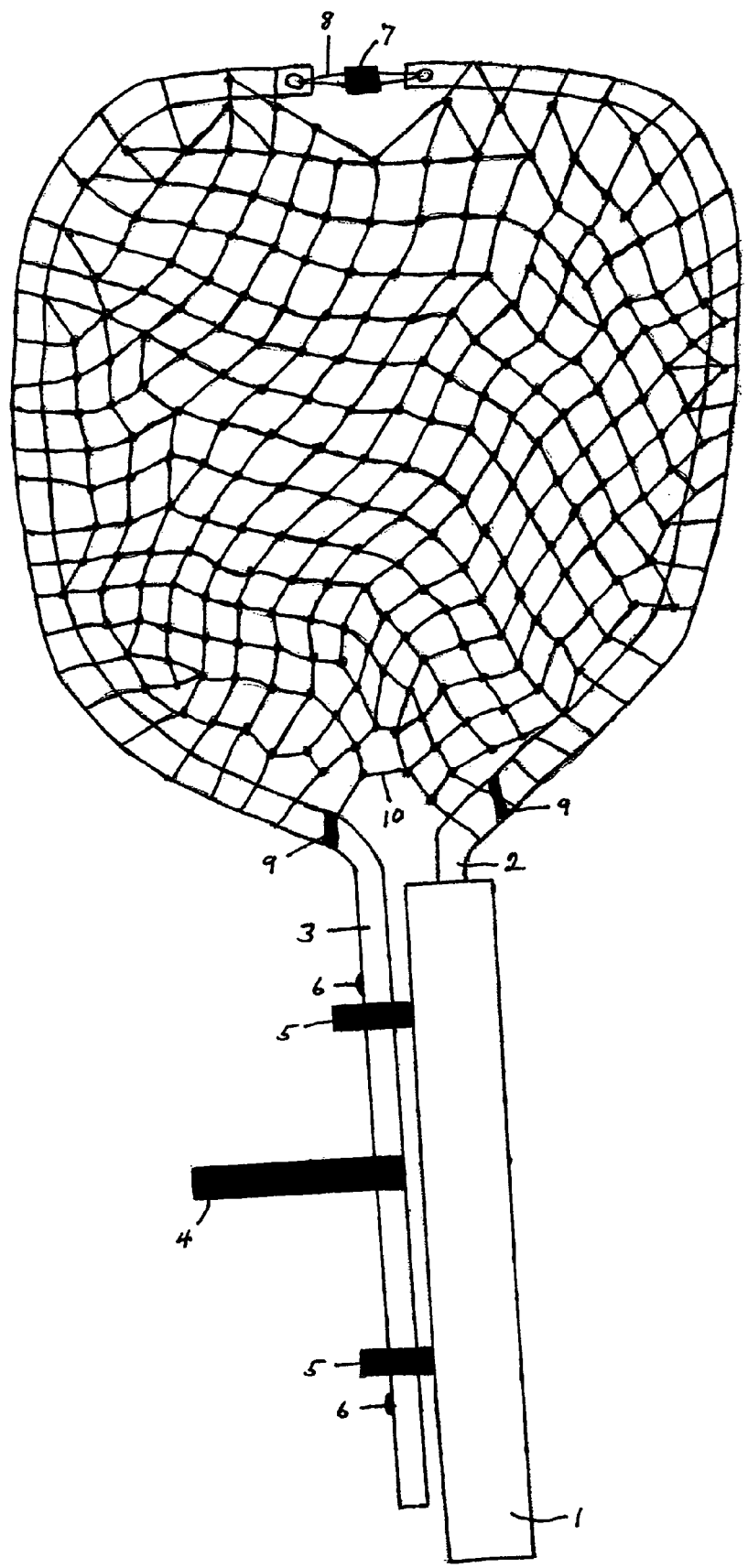
FIG. 3 is a perspective view of the left handed net structure in accordance with present invention, the net being shown in the open position.

FIG. 3 is a top view of the left handed invention in the open position. Everything is exactly the same as the right handed invention except for three things. Handle 1 is held in the left hand, lever 4 is activated with the left thumb, and aluminum frame 3 has 180 degrees of movement from left to right.

Figure 4:
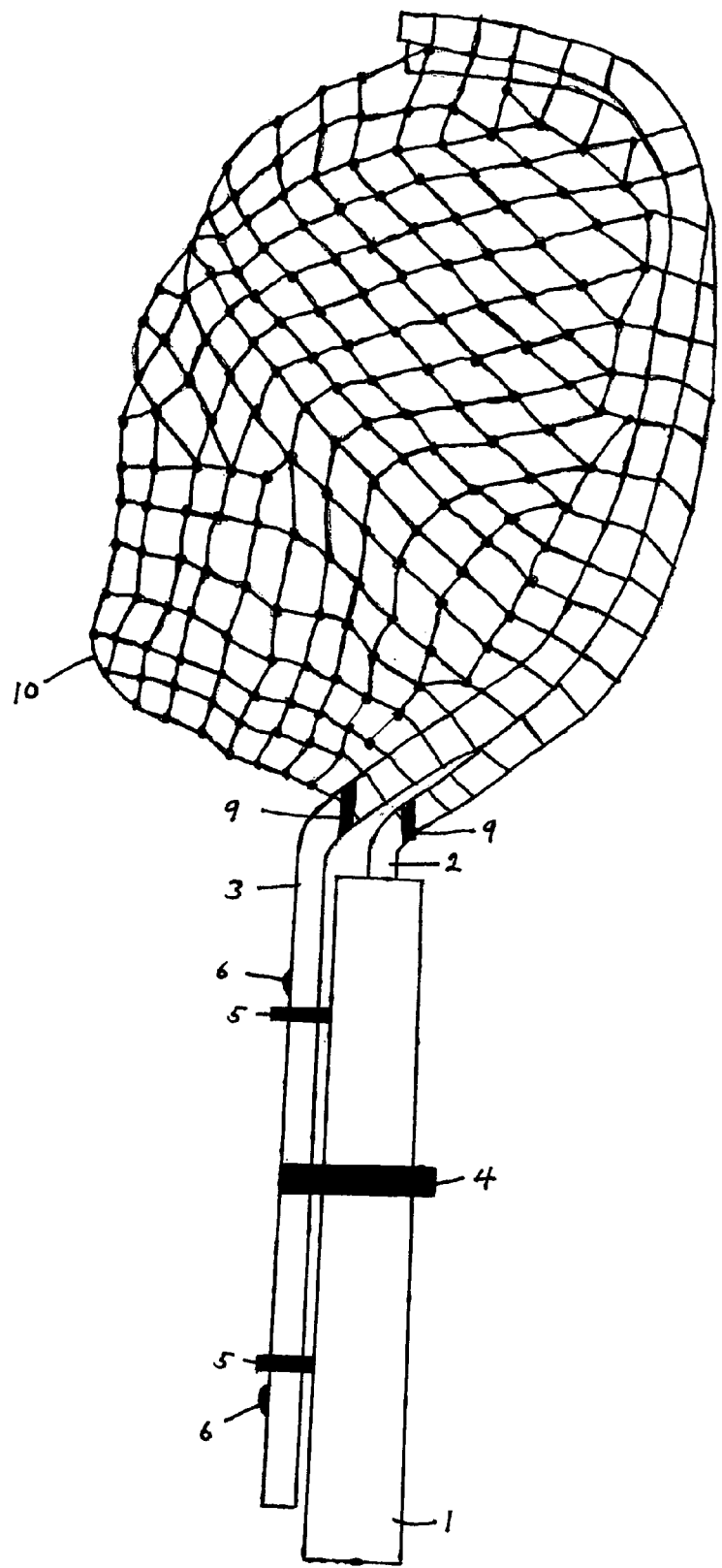
FIG. 4 is a further view of the left handed net in the closed condition.

FIG. 4 is a top view of the left handed invention in the closed position.

Figure 5:
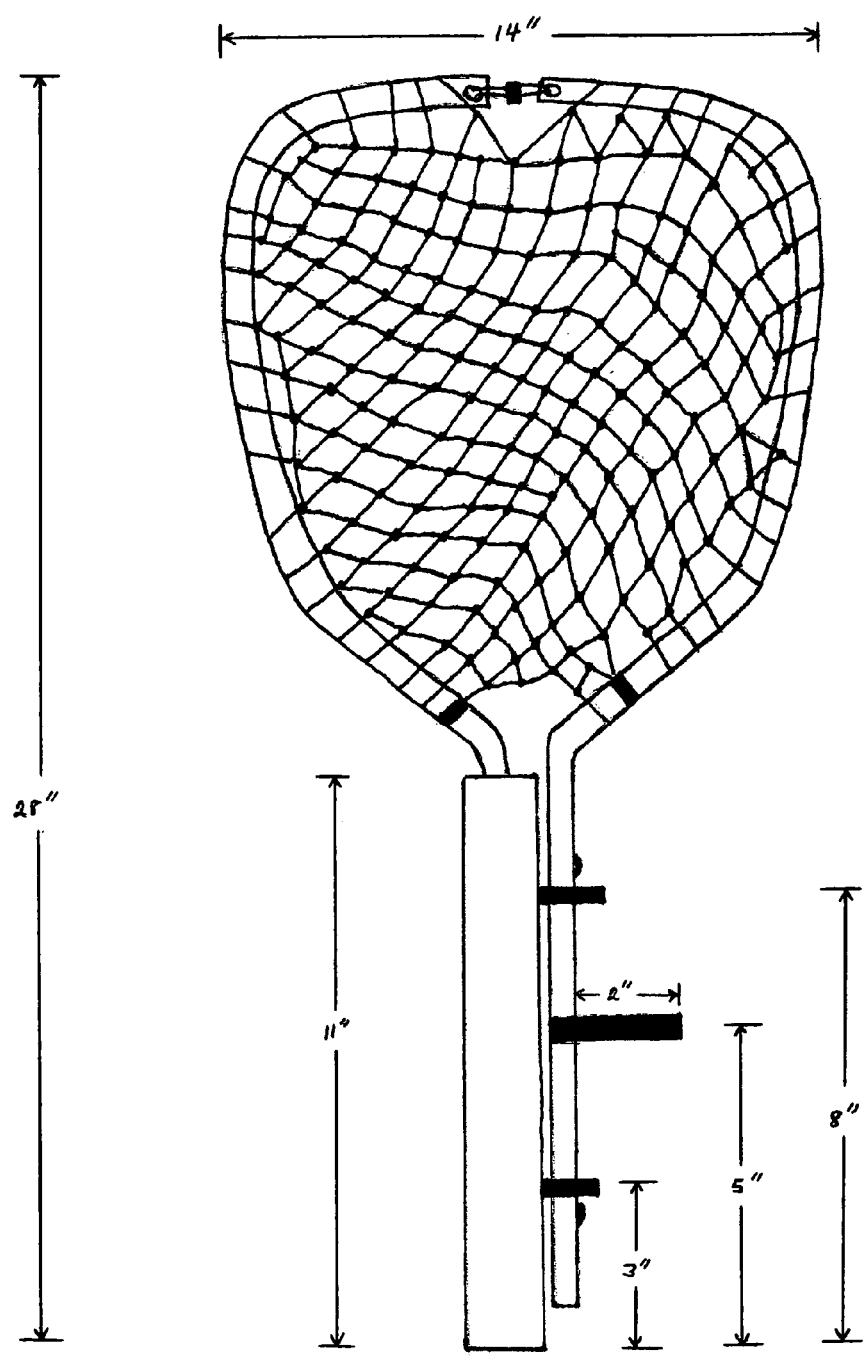
FIG. 5 is a perspective view of the right handed net with all the dimensions.

FIG. 5 is a top view of the right handed invention with all the dimensions.

Figure 6:
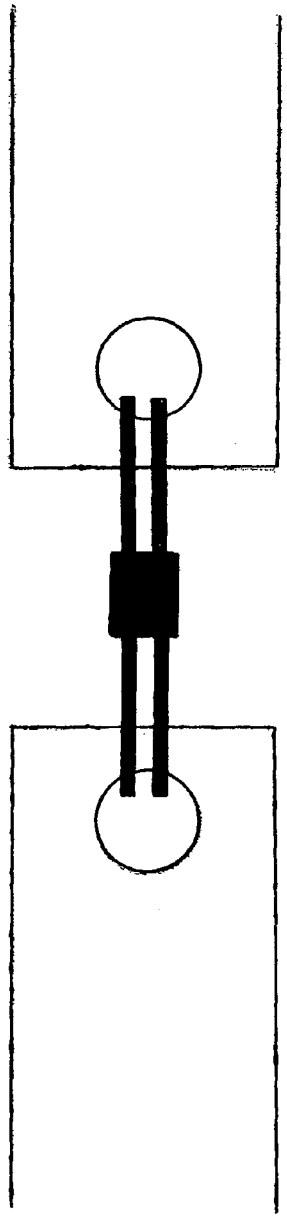
FIG. 6 is a top close-up view of frame 2 and frame 3 being connected together by cable 8 and cable crimp 7.

FIG. 6 is a top close-up view of frame 2 and frame 3 being connected together by cable 8 and cable crimp 7. The cable is doubled for extra strength and allows frame 3 to have one hundred and eighty degrees of motion. Crimp 7 fastens cable 8 together.

Figure 7:
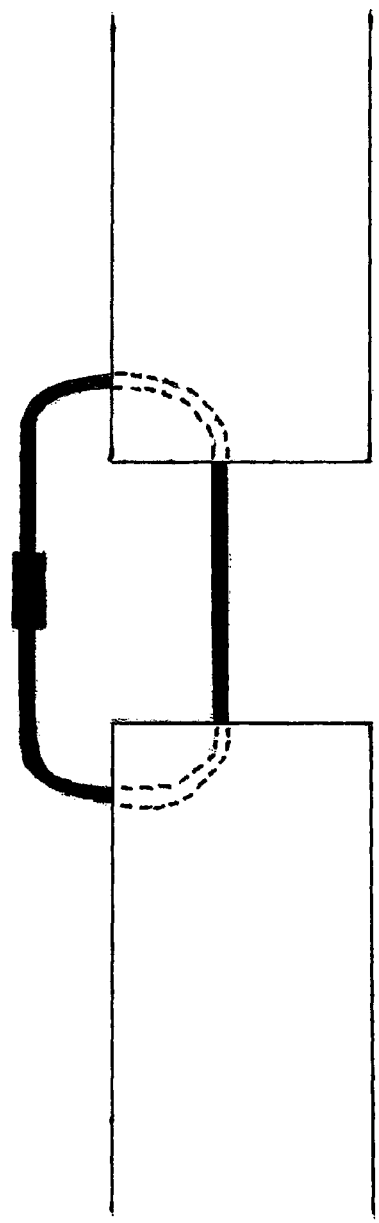
FIG. 7 is a side close-up view of frame 2 and frame 3 being connected together by cable 8 and cable crimp 7.

FIG. 7 is a side close-up view of frame 2 and frame 3 being connected together by cable 8 and cable crimp 7. This illustrates that only the top halves of frame 2 and frame 3 have holes drilled into them. Cable 8 is then fed through the holes and the open ends of frame 2 and frame 3.

Figure 8:
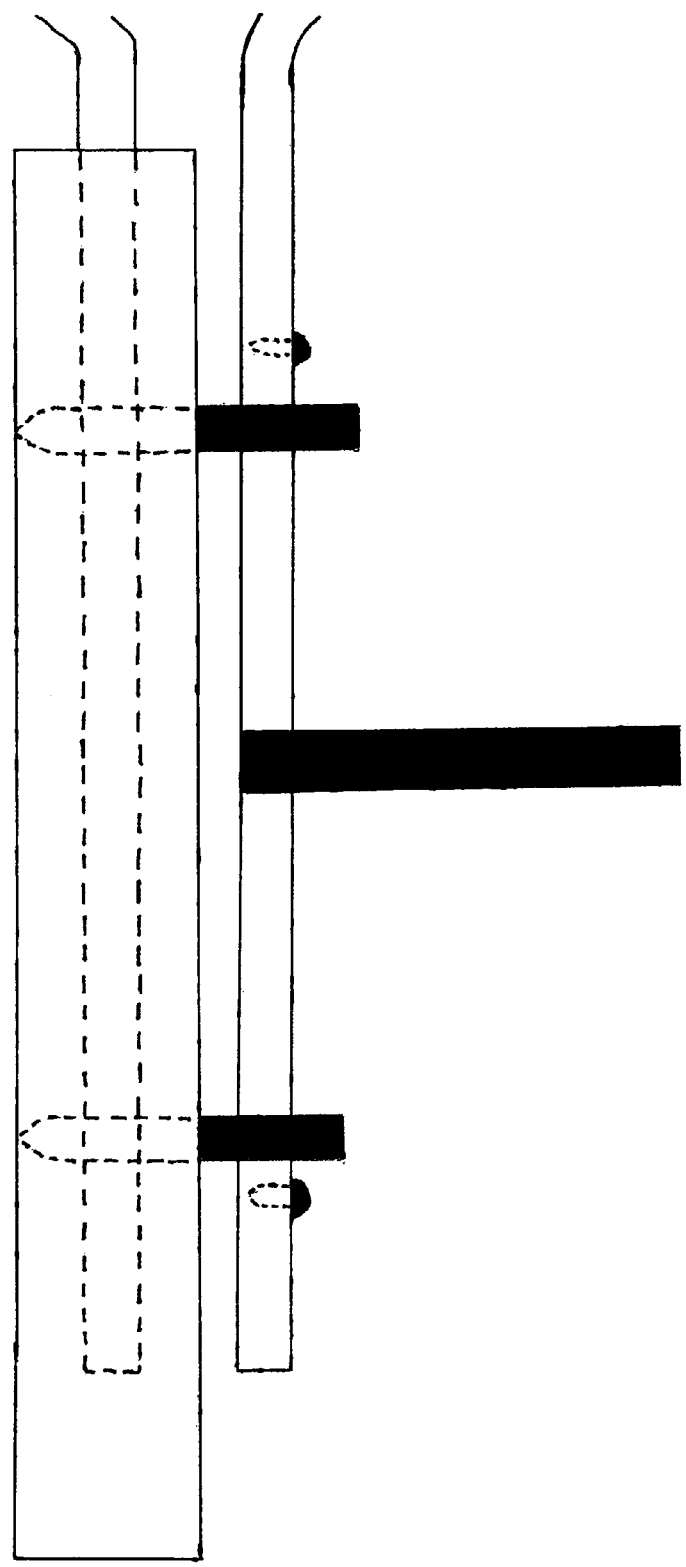
FIG. 8 is a cross sectional view of handle 1 and frame 2.

FIG. 8 is a cross sectional view of handle 1 and frame 2. This illustrates eyebolts 5 securely holding frame 2 to handle 1. Holes are drilled into one side of handle 1 to allow eyebolts 5 to be screwed into. Holes are also drilled all the way through frame 2 to allow eyebolts 5 to be screwed all the way through. The ends of eyebolts 5 rest on the inside of the other side of handle 1 securely holding frame 2 into place.

DRAWING ITEMS INDEX

1 Handle—¾ inch PVC Pipe
2 Frame—½ inch aluminum tubing
3 Frame—½ inch aluminum tubing
4 Thumb Lever—2½ inch bolt
5 Eye Bolt—1¾ inch ⅝ inch Diameter
6 Sheet metal screw—¾ inch
7 Cable Crimp—1/16 inch
8 Picture Hanging Cable—25 Lbs.
9 Hose Clamp—½ inch
10 Net

I claim:
1. A netting device capable of closing via a one hand operation thereby preventing a crustacean or other underwater creature from escaping, the netting device comprising:
 a substantially hollow handle;
 a first frame member fixedly secured inside said handle by at least two eyebolts, wherein the eyes of said eyebolts extend outside of said hollow handle;
 a second frame member inserted into said eyes thereby allowing said second frame member to rotate approximately 180 degrees in a closing direction, each frame member having a top and a bottom;

a thumb operated lever fixedly secured to the second frame member allowing a user to one-handedly close and open the netting device;

the respective tops of said frame members being connected via a flexible cable;

a flexible net connected along a perimeter formed by said frame members, wherein said flexible net is fixedly secured to the bottom of said frame members.

2. The netting device of claim 1, wherein said device has an overall density greater than that of sea water thereby allowing the device to fall upon accidental release.

3. The netting device of claim 1, wherein said handle is of a florescent color allowing ease of visual contact.

4. The netting device of claim 1, wherein said device is arranged to allow either left-handed or right-handed operation.

* * * * *